Oct. 9, 1934.  F. P. LACKINGER  1,975,795
GEAR SHIFTING MECHANISM
Filed June 1, 1932   3 Sheets-Sheet 1
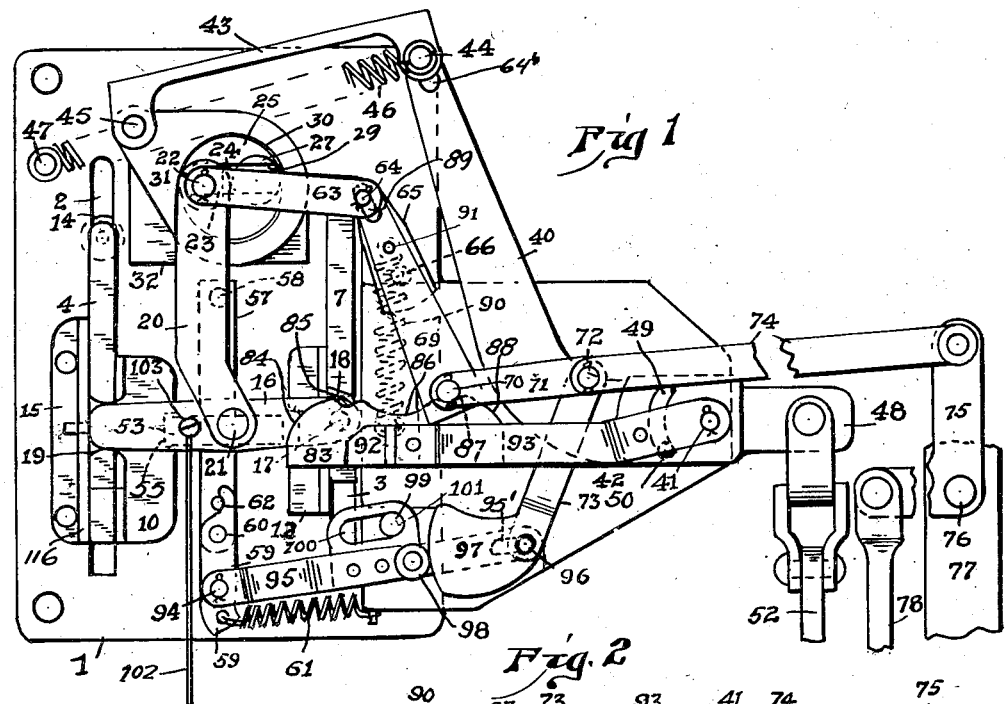
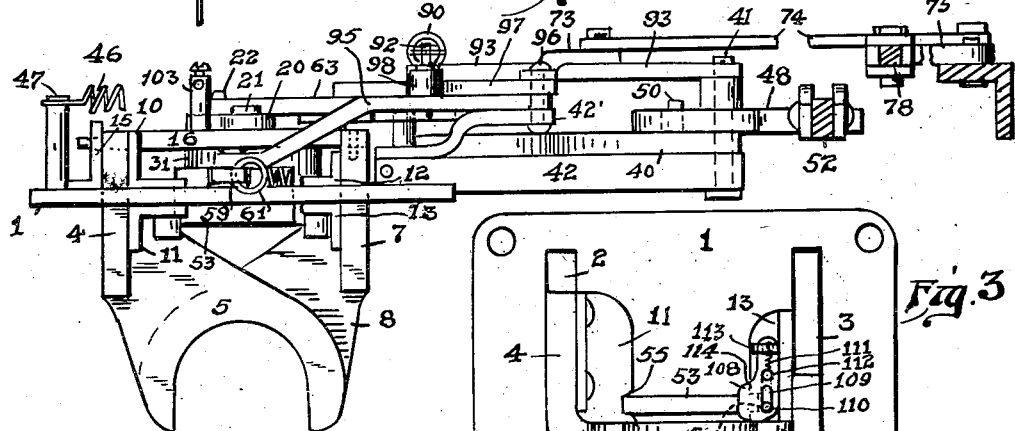
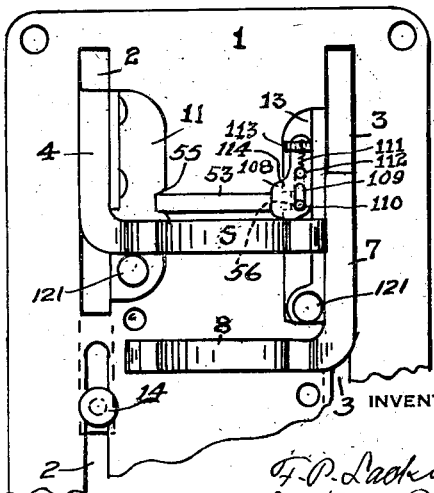
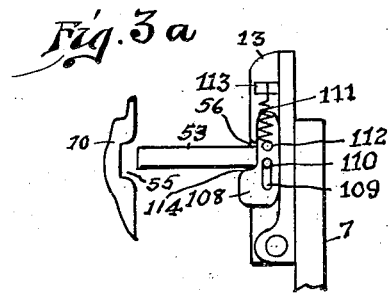
INVENTOR.
F. P. Lackinger
by F. N. Barber
Attorney

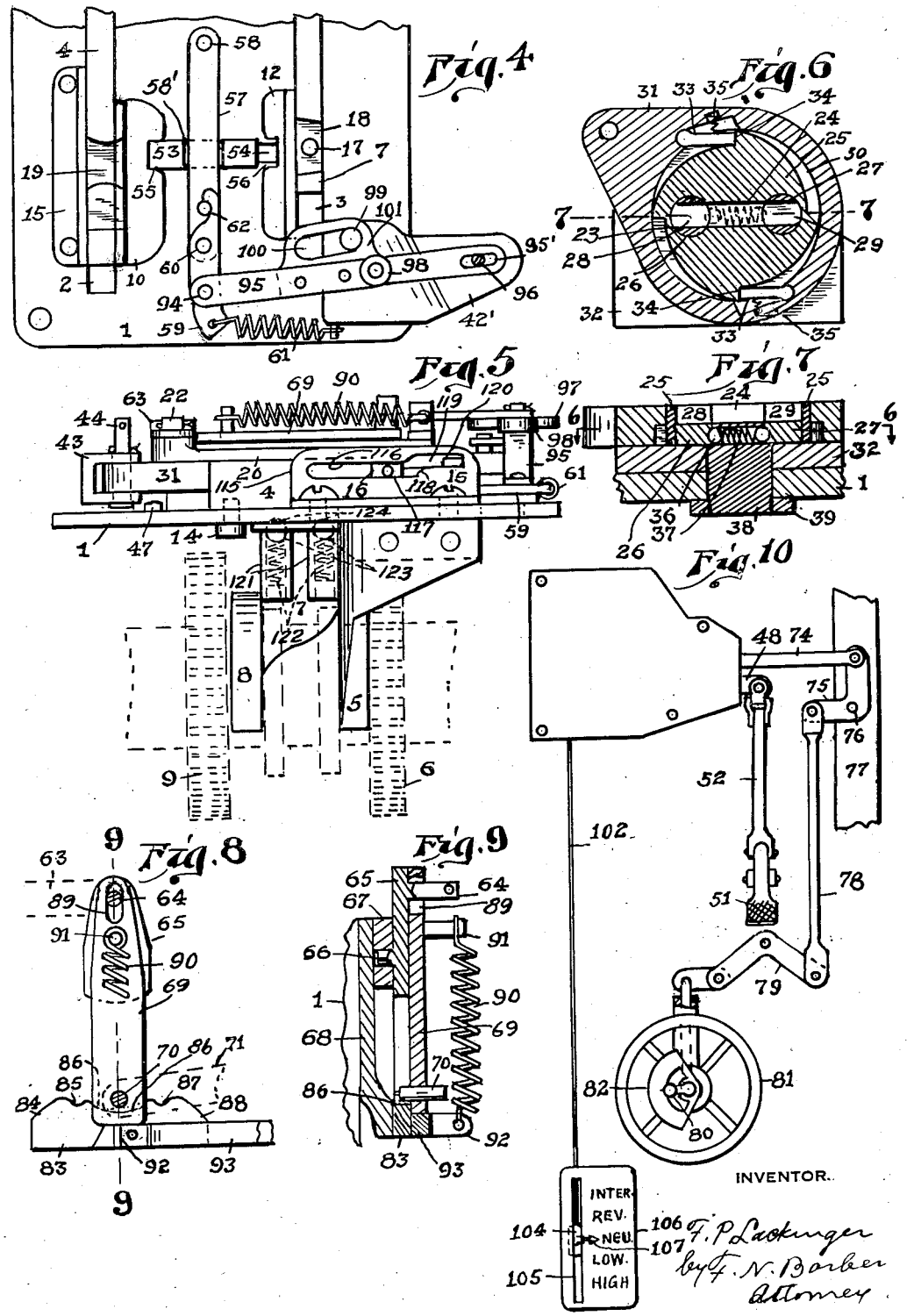

Oct. 9, 1934.   F. P. LACKINGER   1,975,795
GEAR SHIFTING MECHANISM
Filed June 1, 1932   3 Sheets-Sheet 3
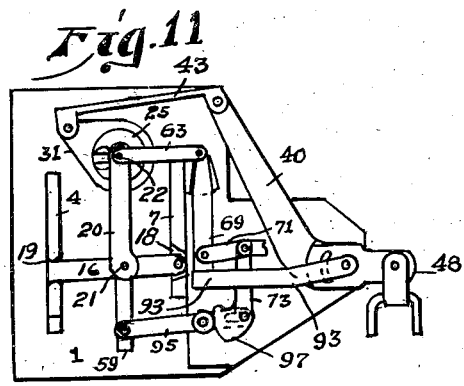
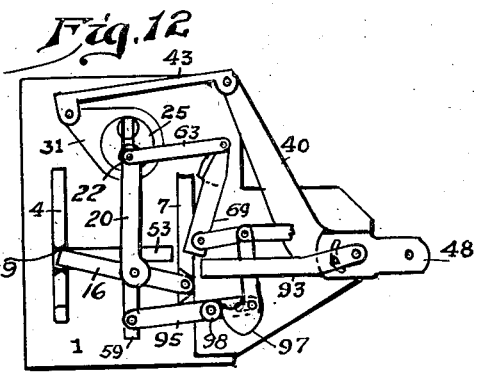
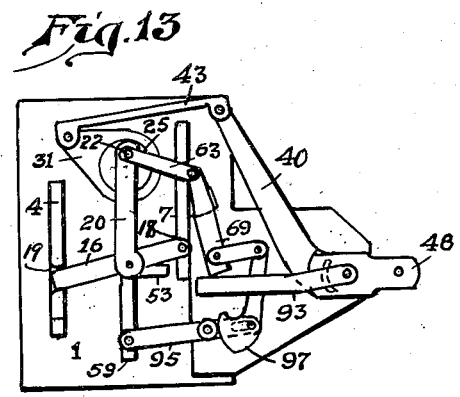
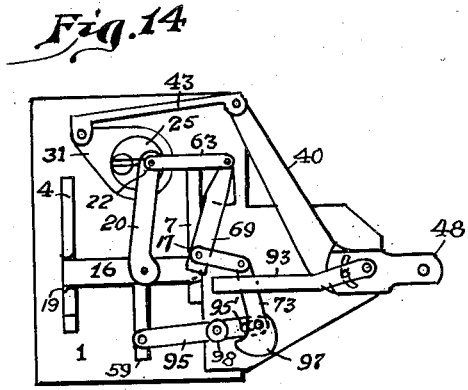
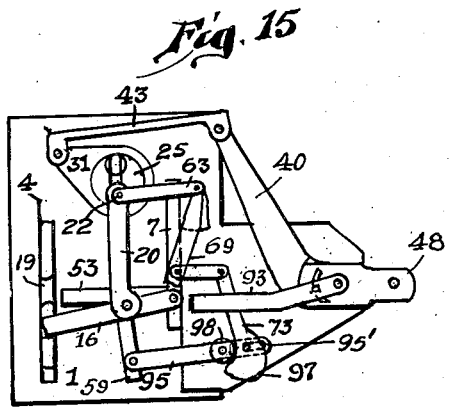
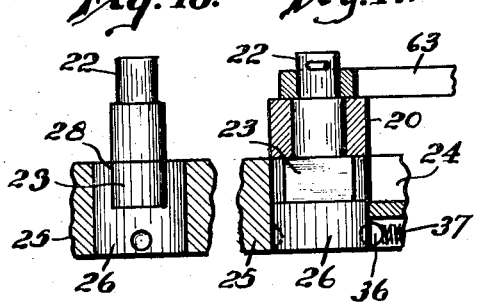
INVENTOR.
F. P. Lackinger
by F. N. Barber
attorney Patented Oct. 9, 1934

1,975,795

UNITED STATES PATENT OFFICE 1,975,795

GEAR SHIFTING MECHANISM

Frank P. Lackinger, McKees Rocks, Pa.

Application June 1, 1932, Serial No. 614,664

20 Claims. (Cl. 74—58)

My invention relates to gear-shifting mechanism designed particularly for automobiles, but it is applicable to other types of apparatus besides automobiles.

It is one object of my invention to provide a gear-shifting mechanism whose gears are shifted by the depression of the clutch pedal. Another object is to provide means for shifting progressively from neutral into low and then into intermediate and high and thence if desired back into intermediate and again into high and so on, but the gears cannot be progressively shifted back to low. I provide also for the alternal progressive shifting between reverse and low. I also provide for the shifting of the gears into low, which I call independent low, from which the gears cannot be shifted except into neutral unless certain selecting devices are moved to a certain position. I also provide for shifting the gears into reverse, which I call independent reverse, from which the gears cannot be shifted except into neutral unless the said selecting devices are reset for a different sequence of operations. Other objects relate to details which will be best understood after they have been described.

Referring to the accompanying drawings, Fig. 1 is a top plan view of my invention, portions of the same being broken away.

Fig. 2 is a side elevation of Fig. 1.

Fig. 3 is a bottom plan of the gear-shifting forks and certain interlocking devices for the bars which support the forks.

Fig. 3a is a bottom plan view showing the central parts of Fig. 3 in a different position from those shown in Fig. 3.

Fig. 4 is an enlarged view of the lower left-hand part of Fig. 1, parts being omitted.

Fig. 5 is a side elevation of Fig. 1, looking toward the right.

Fig. 6 is a horizontal section on the line 6—6 on Fig. 7.

Fig. 7 is a vertical section on the line 7—7 on Fig. 6.

Fig. 8 is a plan view of the selector lever and adjacent parts, portions being in section and broken away.

Fig. 9 is a section on the line 9—9 on Fig. 8.

Fig. 10 is a diagrammatic view showing pedal connections for shifting the gears, mechanism for setting the selector lever 69 and indicating means showing the setting of the gears.

Figs. 11 to 15 show diagrammatically some of the various positions which the mechanism assumes, Fig. 11 showing the parts set for neutral, Fig. 12 showing them set for independent low, Fig. 13 showing them set for independent reverse, Fig. 14 showing them set in neutral preparatory for setting them into low, and Fig. 15 shows them set for high.

Fig. 16 is a side elevation of the pin 22, the block 23 and the cylinder 26.

Fig. 17 is a central vertical section of Fig. 16, together with a vertical section of a portion of the cylinder 25 and the links 20 and 63.

On the drawings, 1 designates a horizontal metal base-plate adapted to form the cover of a gear-transmission case and a support for the other parts of the mechanism constituting my invention. It has the two parallel slots 2 and 3 extending entirely through the thickness thereof. A bar 4 is slidable longitudinally in the slot 2 and has a portion above the base-plate 1 and a portion below the same, the latter portion having rigidly therewith the gear-shifting fork 5 for shifting the gears into neutral, intermediate, and high. The gearing for such shifting is well known and I have indicated its presence merely by dotted lines at 6 where only one gear wheel is shown. The bar 7 slides lengthwise in the slot 3 and has portions above and below the base-plate, the part below the base-plate being rigid with the gear-shifting fork 8 for shifting other gears into neutral, low, and reverse. The latter gears are indicated merely by the presence of the gear 9.

The bar 4 has secured to its inner face the angle plates 10 and 11 respectively slidable on the upper and lower faces of the base-plate 1 to support and guide the bar 4. Similar angle plates 12 and 13 are attached to the inner face of the bar 7, these plates being slidable on the respective upper and lower faces of the base-plate 1 to support and guide the bar 7. The end of the bar 4 is provided with a pin having the head 14 slidable on the lower face of the base-plate to prevent the bar 4 from upward movement. A portion of the outer face of the bar 4 is guided by the angle plate 15 secured to the upper face of the base-plate.

16 is a single rigid horizontal lever having one end pivoted on the pin 17 in a notch 18 in the upper edge of the bar 7, while the other end of the lever lies loosely in the notch 19 in the upper edge of the bar 4. 20 is a link pivotally connected at one end to the pin 21 between the ends of the lever 16 and at the other end to the upper end of the pin 22 on a stud having its lower end forming the block 23 slidable horizontally in the upwardly-open slot 24 in the rotary vertical cylinder or disk 25. At the ends of the slot 24 are the vertical cylinders 26 and 27 rotatable in bearings in the disk 25, and provided in their upper ends with open-topped slots 28 and 29 respectively having parallel sides flush with the parallel sides of the slot 24. The block 23 has opposite sides parallel and fitting against the opposite walls of the slot 24 and the seats in the cylinders 26 and 27. The block is sufficiently short lengthwise of the slot 24 so that it can be received within the periphery of either slot 28 or 29. The length of the slots 28 and 29, and therefore of the block 22 is greater than the width of the slot 24, so that, when the cylinder 25 is turned to lie transversely of the slot 24 as shown in Figs. 12, 13, 15 and 18, the block 23 can not enter the slot 24 and allow the gearing to be automatically shifted to neutral. The pin 22 is rigidly fixed in the link 20 so that this pin which is small will sustain no friction from the link, all the friction and strain required being taken by the periphery of the cylinders 26 and 27 which are quite large and strong.

The disk 25 is rotarily mounted within a vertical opening 30 in the oscillatory arm 31, seated on the block 32 secured to the upper face of the base-plate 1. The arm carries in the wall of the opening 30 the pawls 33 adapted to engage shoulders 34 on the periphery of the disk 25 whereby the arm 31 may drive the disk clockwise when it is oscillated. The pawls are urged toward the disk by the springs 35. Extending counter-clockwise from the shoulders are grooves gradually tapering in depth to the periphery of the disk, so that when the arm 31 is moved counterclockwise the pawls are gradually moved out into recesses in the arm so that when the arm has fully returned after rotating the disk one step the pawls may drop behind other shoulders ready to rotate the disk another step when the arm is next moved clockwise. In order to prevent the cylinders 26 and 27 from accidentally turning, balls 36 are seated partly in the cylinders 26 and 27 and partly in a slot in the base of the disk, a spring 37 being positioned in the slot and urging the balls outwardly. The block 32 is secured to the base-plate 1 by the stud 38 secured in the block 32 and clamped to the base-plate by the nut 39 bearing against the lower face of the base-plate 1, as shown in Fig. 7.

40 is a lever pivoted on the pin 41 supported by the base-plate extension 42, one end of the lever being connected by the link 43 to the arm 31 by means of the pivot pins 44 and 45. A spring 46 has its ends connected to the pivot pin 44 and the pin 47 on the base-plate 1. The spring tends to hold the arm 31 inclined to the left, as shown on Fig. 1. A short lever 48 is pivoted between its ends on the pin 41 and has near one end the arcuate slot 49 in which the pin 50 on the lever 40 is positioned. The remaining end of the lever 48 is pivotally connected to the clutch-operating pedal 51 by the link 52.

53 is a locking bar slidable in the slot 54 in the base-plate 1 and projecting above and below the base-plate at each side thereof. The opposing edges of the angle-plates 10 and 12 are provided with opposite notches 55 and 56 to receive the respective ends of the locking bar 53, the length of the locking bar being such that when it is in one notch it is entirely out of the other. The angle-plates 11 and 13 also have notches 55 and 56 lying beneath the notches 55 and 56 in the angle-plates 10 and 12 to receive the ends of the locking bars 53 when they enter the notches in the angle-plates 10 and 12. A lever 57 lying beneath the lever 16 and the link 20 and carried by the pivot pin 58 supported by the base-plate 1 lies in a notch 58' in the upper face of the locking bar so that the oscillation of the lever 57 will cause the longitudinal movement of the locking bar to enter one or the other of the notches 55 and 56. The remaining end of the lever is provided with a supplemental lever 59 carried by the latter by means of the pivot pin 60. A spring 61 attached to the base-plate extension 42 and to one end of the lever 59 tends to move the lever 59 toward the right. The remaining end of the lever 59 engages a pin 62 on the lever 57 so that in some instances the levers 57 and 59 operate as a rigid element.

63 is a link having one end pivoted on the pin 22 and the other end connected by the pivot pin 64 carried by one end of the lever 65, the lever 65 having the bearing pin 66 in an opening in the block 67 secured to the plate 68 supported by the base-plate 1, as shown in Fig. 9. 69 is a lever forming a selector or latch having one end pivoted to the pin 64 while the other end carries a latching pin 70 to which one end of the link 71 is pivotally connected. The link 71 is connected by the pivot pin 72 to one end of the lever 73 and to one end of the link 74. The outer end of the link 74 is connected to one end of the bell crank lever 75 carried by the pin 76 on any convenient fixed structure as 77. The other arm of the bell crank lever operates the link 78 which in turn operates the bell crank lever 79, operated in any desired manner as by the handle 80 on the top of the steering wheel 81. The handle serves as a pointer for positioning the handle opposite certain indications on the sector 82 on the steering wheel 81. The pin 70 rides on the edge of the selector plate 83 carried by the plate 68. The said edge of the selector plate is provided with depressions 84, 85, 86, 87 and 88. The pin 70 serves as a selector pin to hold the controlling mechanism so that the gears may be shifted to place the gears in neutral, high, low or reverse. As the latch 69 is moved back and forth it must rise or fall slightly to pass from one depression to another. This is permitted by the slot 89 for the pin 64 on the selector or latch 69. A spring 90 has one end connected to the pin 91 on the latch 69 and the other end attached to the arm 92 on the bar 93. The bar has one end attached to the selector plate 83 and the other end to the pin 41.

94 is a pivot pin carried by the lever 59 at the opposite side of the pivot pin 60 from the pin 62. A link 95 connects the pivot pin 94 with the pivot pin 96 which is supported by the off-set plate 42' on the extension 42 of the base-plate and supports the lever 73 between its ends. The link 95 has a slot 95' in order to provide lost motion between the link 95 and the pin 96. The end of the lever 73 opposite the pivot pin 96 from the pivot pin 72 forms the cam 97 whose outer end at times forms an arc-shaped track for the roller 98 on the link 95. The link is guided by the pin 99 which is positioned in a slot 100 in the plate 101 carried by the link.

A wire 102 is connected at one end to the pin 103 on the lever 16 and at the other end to the sliding block 104 having travel in the slot 105 in the indicator plate 106. The block 104 carries a pointer 107 which shows to the operator of the automobile the position to which the transmission gears have been shifted.

Figs. 4, 8, 9, 10 and 11 show the mechanism set for mechanical neutral. The selector or latch 69 is in its central position with its flat end seated in the flat edge of the bar 93 as shown in Figs. 8, 9 and 11, the selector being thus supported so as not to hang on the pin 64, as shown in Figs. 8 and 9. In this position the selector 69 is not easily swung laterally parallel with the base-plate 1, the spring 90 holding the flat end of the selector firmly in the flat edge of the bar 93 whereby the bars 2 and 3 cannot be accidentally moved to shift the gears into driving relation with the motor. The selector pin 70 does not here rest on the bottom of the depression 86 because the selector should rest squarely on the bar 93 for the purpose just specified.

Suppose the gears are to be shifted progressively into low, intermediate and high, the handle 80 is moved down to its lowest position so that when the pedal is actuated the pointer 104 will register with the word High on the indicator 106. This causes the elements 79, 78, 75, 74 and 71 to move the selector lever 69 to the extreme left so that the lever will be suspended on the pin 64 and the selector pin 70 will be at the depression 84 in the selector plate 83. At all positions of the selector lever 69, except when the bar 4 has been moved toward the bottom of Figs. 1 and 4 to throw the mechanism into high, the cam 97 engages the roller 98 and holds the compound lever 57—59 so as to keep the locking bar 53 in the notches 55 in the angle-plates 10 and 11 and prevent any movement of the shifting bar 4. A dog 108 on the lower face of the angle bar 13 is shown in Fig. 3 seated between the right-hand end of the locking bar and the vertical member of the angle plate 13 to prevent the bar 53 from moving into the notches 56 in the angle plates 12 and 13 as soon as the cam leaves the roller 98. Such movement of the bar 53 would lock the shifting bar 7 and prevent the gears from being set into low. When the selector lever 69 has been set to the extreme left as described the lever 73 has also been moved so as to free the roller 98 from the cam 97, but the spring 61 cannot operate the lever 57—59 and the locking bar 53 because the dog 108 stands in the path of the bar 53.

The dog has the slot 109 to receive the pin 110 carried by the lower side of the angle-plate 13. 11 is a spring connecting the pin 112 on the dog with the pin 113 carried by the angle-plate 13, the spring tending to move the dog so as to have the pin 110 in the end of the slot 109 farthest from the pin 113.

When the selector lever 69 moves to the left the pin 70 first interlocks with the depression 85, at which time the pin 91 supporting the spring 90 has passed to the right of the bearing pin 66 so that the spring causes the lever 69 to move clockwise on the pin 70 and pull the link 63 to the right and slide the block 23 connected to the pin 22 to the right and into the slot 29. The parts are now as in Fig. 14.

The clutch pedal 51 is now depressed preliminarily to the shifting of gears as ordinarily effected. Motion is transmitted from the pedal through the elements 52, 48, 40, 43, and the arm 31, causing the arm to move to the right and through the pawls 33 causing the cylinder 25 to turn 90° to the right.

The cylinder 25 has brought the pin 22 to the position shown in Fig. 15 and the link 20 has been lowered as shown in Fig. 15, but the lever 16 has moved to the position shown in Fig. 12. At the start of the downward movement of the link 20, the dog 108 was through the locking-bar 53 still locking the bar 4 and holding the gears out of high and intermediate, as shown in Fig. 3. Accordingly, the left-hand end of the lever 16 has its fulcrum in the notch 19, as shown in Figs. 12 and 13. The bar 7 is moved by the lever 16 as the link travels, the dog 108 holding the bar 53 out of the locking notches 56 until the notch moves out of the path of movement of the dog to the right. As the dog passes beyond the bar 53, the latter owing to the spring 61 moves to the right against the adjacent edge of the angle bar 13 and into the return path of the shoulder 114 on the dog. The parts will then be as in Fig. 15 except that the cam 97 will be out of contact with the roller 98, as in Fig. 14. The parts are now positioned for driving the gears in low.

Upon again pushing the pedal 51 downwardly, the cylinder 25 is turned 90° to the right causing the pin 22, the link 20, the lever 16, and the bar 7 to be moved to the neutral positions shown in Fig. 1. As the bar 7 returns the shoulder 114 on the dog is stopped by engagement with the locking bar 53. When the bar 7 reaches its central or neutral position, the dog 108 has been held back as shown in Fig. 3a by the bar 53 engaging the shoulder 114 so as to uncover the notches 56, and the locking bar 53 moves to the right out of the notches 55 in the angle-plates 10 and 11 and into the notches 56 in the angle-plates 12 and 13, this being accomplished automatically by the spring 61 because the cam 97 is out of the path of the roller 98. The link 95 and the roller have now moved to the right as shown in Fig. 15. The gears are now in neutral. Now the shifting bar 7 is locked by the bar 53 and the shifting bar 4 is unlocked. The lever 16 now has its fulcrum on the pin 17 on the bar 7.

Upon pressing the pedal 51 again, the cylinder 25 is turned 90° to the right bringing the pin 22, the link 20 to the positions shown in Fig. 13, but the bar 4 will be moved upwardly to shift the gears into intermediate or second.

Upon again pressing the pedal, the cylinder 25 is rotated 90° to the right bringing the parts to the positions shown in Fig. 14, except that the link 95 has moved to the right further as shown in Fig. 15, bringing the roller 98 closer to the cam 97.

Upon pressing the pedal again, the cylinder 25 is rotated 90° and the parts moved to the positions shown in Fig. 15, the shifting bar 4 being moved toward the observer or toward the bottom of the sheet of drawings. As this invention is applicable to the usual sliding transmission gearing which requires a shorter travel of the shifting fork when changing from neutral to high, I have adapted this invention to this requirement. The bar 4 when moved into high from neutral has less travel in the slot 2 than when it is moved from neutral to intermediate, as shown by the length of the slot 2 exposed at the opposite ends of the bar 4. When the lever 16 moves the bar 4 downward to the end of the slot 2 near the edge of the base-plate 1 nearest the observer, further travel of the left-hand end of the lever 16 is required in order that the cylinder 25 may make its usual 90° movement.

The angle bar 15 has its vertical member 115 provided with the slot 116 in which the pin 117 on the end of the lever 16 is positioned. As the lever moves the bar 4 toward the gears for high, the pin 117 reaches the inclined shoulder 118 in the slot 116 and causes the adjacent end of the lever to be lifted out of the notch 19 and guided along the extension 119 of the slot and at a higher level until the lever 16 reaches the shoulder 120 on the bar 4. Thus the lever 16 is allowed to travel after the bar 4 is stopped in order that the lever 16, the link 20, the pin 22 and the cylinder 25 may travel their full distances when the pedal 51 is pressed to throw the gears into high.

When the pedal is again pressed, the pin 22, the link 20, the lever 16 and the bar 4 move to the positions shown in Fig. 1. As the cam 97 does not engage the roller 98, the spring 61 holds the locking bar 52 in the notches 56. Obviously the mechanism is set in neutral, as it always is when the lever 16 is set at right angles with the bars 4 and 7. When the pedal is again pressed, the pin 22 and the link 20 move to the positions shown in Fig. 13, but the lever 16 moves on its pivot 17 toward the upper part of Fig. 13 and restores the bar 4 to its rear position which puts the gears in intermediate or second. When the pedal is next pressed the pin 22, the link 20, the lever 16 and the bar 4 arrive at the positions shown in Fig. 14 and the gears are again in neutral. After the pedal is pressed again the parts are again moved to set the gears into high. Another pressure on the pedal sets the gears into neutral. As long as the selector lever 69 remains at its extreme left position alternate pressure on the pedal throws the gears into neutral while the remaining pressure throws them alternately into intermediate and high, assuming they were in high at the start. The cycle of neutral, intermediate, neutral and high will repeat itself by consecutive four pressures of the pedal, irrespective of the step at which the cycle begins.

To set the mechanism for automatic or progressive reverse and low, the handle 80 is moved to its uppermost position. This movement of the handle causes the selector lever 69 to move to its extreme right-hand position with the pin 70 in the depression 88. When the pin 70 reaches the depression 85, the pin 22 is moved along the slot 24 to the extreme right. The pin moves to the middle of the slot 24 when the selector lever reaches the central position shown in Fig. 8, and it returns to the extreme left into the slot 28 when the pin 70 reaches the depression 87 and stays there when it reaches the depression 88. At the same time the lever 73 has been moved to cause the cam 97 to engage the roller 98 and push the link 95 to the left, which causes the compound lever 57—59 to push the locking bar 53 into the notches 55, the parts being as shown in Fig. 4. The parts are now set for shifting the gears to reverse.

When the pedal is depressed to release the clutch, the cylinder 25 is rotated 90° from the position shown in Fig. 1 to its position as shown in Fig. 13. The pin 22 pulls the link 20 up causing the lever 16 to turn in the notch 19 and raise the bar 7 which causes the fork 8 to shift the gears into reverse. When the pedal is next depressed to open the clutch, the cylinder 25 rotates 90° to the position shown in Fig. 14, the lever 16 returning the bar 7 and its fork 8 to neutral. Upon depressing the pedal again, the cylinder 25 is rotated 90° to the position shown in Fig. 12, the link pushing the lever 16 to shove the bar 7 forwardly and set the gears in low. The pedal being depressed again the cylinder 25 turns to position the pin 22 as in Fig. 1, the link 20 pulling the lever 16 so as to put the bar 7 in its neutral position. With the selector lever remaining at its extreme right position, the continued operation of the pedal will cause the gears to follow the cycle just described.

The handle 80 may now be moved to position the pin 70 in the depression 86. The parts are then as in Fig. 1, in which the gears are in neutral. When the pedal is depressed the cylinder 25 turns to the position shown in Fig. 13 which shows the bar 7 moved to set the gears in reverse as hereinbefore shown. As soon as the pedal is again depressed the cylinder is rotated to the position shown in Fig. 14, which places the gears in neutral, but the pin is immediately moved by the tension of the spring 90 across the slot 24 to the other side of the cylinder and the parts are again ready to be moved to reverse upon the next depression of the pedal. This setting just described is for independent reverse which means that the gears are set for reverse without the possibility of shifting the gears into low, intermediate or high until the selector lever 69 has been moved to a new setting.

The handle 80 may now be moved so that the selector pin 70 rests in the depression 85 when the spring 90 causes the pin 22 to move to the extreme right as shown in Fig. 14, the parts then being set for neutral, as they always are when the slots 28—24—29 are transverse of the bars 4 and 7. The cam 97 still holds the bar 4 locked against movement as it always does except when the parts are set for progressive or automatic low, intermediate and high. When the pedal is now depressed, the cylinder 25 is rotated to bring the parts to the position shown in Fig. 12, in which the pin 22 has pushed the link 20 so as to cause the lever 16 to move the bar 7 to low, a position hereinbefore described. The setting just described is for independent low, a setting from which only low may be had. By depressing the pedal again, the cylinder is moved to the position shown in Fig. 1, the pin moving with it and being at once moved to the extreme right in the slots 28—24—29 by the action of the spring 90, as shown in Fig. 14. The parts are now set, ready for low when the pedal is again depressed.

When the bar 4 is set for high or intermediate, the handle 80 may be moved to set the selector lever 69 at any of the other positions corresponding to the depression 85—88 ready to shift the gears to the selected new setting whenever the pedal has been pressed twice. However when the bar 4 is set for high or intermediate, the locking bar is out of the locking notches 55. Without some yieldable connection between the handle 80 and the locking bar 53 the handle could not be moved to shift the selector lever 69 to the right from its position at the extreme left. To provide such I have made compound lever 57—59 which allows the movement of the handle 80 to be transmitted to the lever 59 which moves clockwise against the tension of the spring 61 causing the lever 59 to move away from the pin 62. When the parts are in high or intermediate the cam 97 is inoperative as described, but when the link 74 is pulled to the right to move the selector lever 69 to the right the lever 73 acts to cause the cam to engage the roller 98 and move the bar 95 to the left and break the rigid connection of the lever 57—59 at the pin 62. The link 95 is held from movement to the right by the cam 97. The spring 61 tends to turn the lever 59 anticlockwise on the pivot 94. When the pedal is depressed to move the cylinder 25 so as to set the mechanism in neutral, the notches 55 come opposite to the end of the locking bar 53 which is forced in the same by the action of the lever 59 on the pin 60.

The pin 50 is normally in the rear end of the slot 49, opposite the end it occupies in Fig. 1.

When the pedal is depressed the lever 48 is rocked idly until the other end of the slot engages the pin 50. During this movement the pedal has descended enough to release the usual clutch (not shown) for disconnecting the motor from the transmission gearing. Further depression of the pedal causes the lever 48 to transmit motion to the lever 40 which in turn through the link 43 moves the cylinder 25 as described. Upon the release of the pedal, the spring 46 returns the arm 31 to the position shown in Fig. 1, the lever 40 and the link 43 returning to their original positions. If the lever 40 has been operated to rotate the cylinder 25 to effect a desired gear-shift and the automobile has been started and if now the operator decides he wants the next gear setting, he again operates the pedal to throw the mechanism into neutral and then again to effect the selected gear setting.

The angle-plates 11 and 13 have on their lower faces the tubes 121 which contain springs 122 pressing the balls 123 into notches 124 in the bottom face of the base-plate 1 to releasably hold the shifting bars 4 and 7 in their extreme positions.

I claim:—

1. In a gear-shifting mechanism for automobiles, a pair of longitudinally movable bars each carrying a gear-shifting fork, means for releasably locking one or the other of the two bars in its intermediate position, an operating lever having its ends respectively pivotally connected to the bars for moving the bars longitudinally, a link having one end pivoted to the lever intermediate of its ends, a crank pin carried by the other end of the link, a rotary cylinder having a transverse slot in which the pin is slidable and by which the link is reciprocated when the cylinder is rotated with the pin in one end or the other of the slot, means for rotating the cylinder, means for selecting the position of the pin in the slot to determine the direction of travel of the link when the cylinder is rotated or to position the pin at the axial center line of the cylinder to prevent such travel, and means for rotating the cylinder.

2. In a gear-shifting mechanism for automobiles, a pair of longitudinally movable bars each carrying a gear-shifting fork, means for releasably locking one or the other of the two bars in its intermediate position, an operating lever having its ends respectively pivotally connected to the bars for moving the bars longitudinally, a link having one end pivoted to the lever intermediate of its ends, a crank pin carried by the other end of the link, a rotary cylinder having a transverse slot in which the pin is slidable and by which the link is reciprocated when the cylinder is rotated with the pin in one end or the other of the slot, means for rotating the cylinder, a selector element, and means whereby the pin is at one end of the slot when the selector element is in one position and at the other end of the slot when the selector element is in another position and at the axial center of the cylinder when the selector element is in an intermediate position.

3. In a gear-shifting mechanism for automobiles, a pair of longitudinally movable bars each carrying a gear-shifting fork, means for releasably locking one of the other of the two bars in its intermediate position, an operating lever having its ends respectively pivotally connected to the bars for moving the bars longitudinally, means moving the lever on its pivotal connection with the locked bar to move the unlocked bar longitudinally, means for selecting the direction of travel of the unlocked bar, means tending to release the locking means from one of the bars, and means set by the selecting means for preventing the release of the locking means from one of the bars.

4. In a gear-shifting mechanism for automobiles, a pair of gear-shifting bars, an actuating lever therefor having its ends pivotally connected permanently to the respective bars, a locking element to lock one or the other of the bars, a lever for operating the element, a spring tending to move the operating lever to lock one bar, means for selecting the direction the unlocked bar may travel, and means set by the selecting means to cause the operating lever to lock the other bar against the tension of the spring whereby one end of the actuating lever when actuated is moved on its pivotal connection with the locked bar to move the unlocked bar longitudinally.

5. In a gear-shifting mechanism for automobiles, a pair of reciprocating bars each carrying a gear-shifting fork, means for releasably locking one or the other of the bars at its intermediate position, an operating lever for the bars having its ends pivotally connected to the respective bars, a rotary cylinder having a transverse slot, a crank pin having travel in the slot, pivotal means connecting the pin to an intermediate point of the lever, means for selecting whether the pin shall be at the axial center of the slot or at one end or the other thereof, and means for rotating the cylinder step by step for operating the unlocked bar to one limit or the other or to its intermediate position.

6. In a gear-shifting mechanism for automobiles, a pair of reciprocating bars each carrying a gear-shifting fork, means for releasably locking one or the other of the bars at its intermediate position, an operating lever for the bars having its ends pivotally connected to the respective bars, a rotary cylinder having a tranverse slot, a crank pin having travel in the slot, pivotal means connecting the pin to an intermediate point of the lever, means for selecting whether the pin shall be at the axial center of the slot or at one end or the other thereof, means for rotating the cylinder step by step for operating the unlocked bar to one limit or the other or to its intermediate position, and means preventing the pin rotating on its axial center as the cylinder rotates, the ends of the slot comprising slots in bearings loosely rotatable in the cylinder.

7. In a gear-shifting mechanism for automobiles, a pair of reciprocating bars for shifting transmission gears of automobiles, one bar at its opposite limits setting the gears for intermediate and high respectively, the other bar at its limits setting the gears for reverse and low respectively, and both bars when at their intermediate positions setting the gears for neutral, the travel of the bar setting the gears for high being shorter than that for setting the gears for intermediate, a lever having its end pivotally connected to the respective bars, means for releasably locking one or the other of the bars, intermittently operated means having uniform distance of travel at each operation and connected to the intermediate portion of the lever for operating the unlocked bar, and means whereby the lever has an idle travel when the gears are being shifted into high.

8. In a gear-shifting mechanism for automobiles, a pair of parallel gear-shifting bars for setting the gears in different driving combinations when the bars are at any extreme position and for setting each bar in neutral when it is at its intermediate position, means for locking one or the other of the bars in neutral, means for operating the unlocked bar in either direction, means tending to release the locking means when the bar for setting the gears into intermediate and high is locked, means releasably holding the latter bar in locking position, means preventing the latter bar from becoming unlocked when the releasable holding means is made inoperative and before the bar for setting the gears into low has been moved from the position at which it may be locked, and means for removing the preventing means when the latter bar moves to set the gears from low into neutral.

9. In a gear-shifting mechanism for automobiles, a pair of longitudinally movable bars each carrying a gear-shifting fork, means for releasably locking one or the other of the two bars in its intermediate position, an operating lever having its ends respectively pivotally connected to the bars for moving the bars longitudinally, a pitman having one end pivoted to the lever intermediate of its ends, a rotary turret having diametrically-opposite pitman operating means, means carried by the remaining end of the pitman for connection to one or the other of the pitman operating means to give reciprocatory movement to the pitman, the operating lever and the unlocked bar, and means for rotating the turret to effect such reciprocatory movements.

10. In a gear-shifting mechanism for automobiles, a pair of longitudinally movable bars each carrying a gear-shifting fork, means for releasably locking one or the other of the two bars in its intermediate position, an operating lever having its ends respectively pivotally connected to the bars for moving the bars longitudinally, a pitman having one end pivoted to the lever intermediate of its ends, a rotary turret having diametrically-opposite pitman operating means, means carried by the remaining end of the pitman for connection to one or the other of the pitman operating means to give reciprocatory movement to the pitman, the operating lever and the unlocked bar, means for rotating the turret to effect such reciprocatory movements, and means for selecting which pitman operating means is to be connected to the pitman, whereby the direction of the reciprocations may be controlled.

11. In a gear-shifting mechanism for automobiles, a pair of longitudinally movable bars each carrying a gear-shifting fork, means for releasably locking one or the other of the two bars in its intermediate position, an operating lever having its ends respectively pivotally connected to the bars for moving the bars longitudinally, a pitman having one end pivoted to the lever intermediate of its ends, a rotary turret having diametrically-opposite pitman operating means, means carried by the remaining end of the pitman for connection to one or the other of the pitman operating means to give reciprocatory movement to the pitman, the operating lever and the unlocked bar, and means for rotating the turret to effect such reciprocatory movements, and means for selecting which pitman operating means is to be connected to the pitman, whereby the direction of the reciprocations may be controlled, and whereby the pitman may interlock with both pitman operating means to prevent the rotation of the turret when the bars are in their intermediate positions.

12. In a gear-shifting mechanism, a pair of longitudinally movable bars each carrying a gear-shifting fork, one bar at the limits of its stroke setting the mechanism in high and intermediate and the other bar at its limits setting the mechanism into low and reverse, means for selectively locking either bar, a clutch pedal, a lever having its ends respectively pivotally connected to the bars for moving the unlocked bar longitudinally, means actuated by the pedal for operating the lever, and additional selector means for the pedal-operating means to throw the mechanism alternately into low and reverse indefinitely.

13. In a gear-shifting mechanism, a pair of longitudinally movable bars each carrying a gear-shifting fork, one bar at the limits of its stroke setting the mechanism in high and intermediate and the other bar at its limits setting the mechanism into low and reverse, means for selectively locking either bar, a clutch pedal, a lever having its ends respectively pivotally connected to the bars for moving the unlocked bar longitudinally, means actuated by the pedal for operating the lever, and a selector means for causing at a single setting thereof the pedal when successively actuated to rock the lever to throw the mechanism automatically and successively from low into intermediate and high and for preventing the shifting of the mechanism into low as long as the selector remains undisturbed.

14. In a gear-shifting mechanism, means for shifting the mechanism into low, intermediate, high, and reverse, a pedal, means actuated thereby for operating the shifting means, and a selector means which in one position causes successive operations of the pedal to put the mechanism successively into intermediate and high and thence alternately into intermediate and high only, in another position successively into low and reverse, and in another position into low, together with means whereby when the pedal is actuated and the mechanism is shifted to the said low, the mechanism will stay in low as long as the selector means is undisturbed.

15. In a gear-shifting mechanism, means for shifting the mechanism into low, intermediate, high, and reverse, a pedal, a pair of longitudinally movable bars each carrying a gear-shifting fork, means for selectively locking said bars against movement, a lever having its end respectively pivotally connected to the bars for moving the unlocked bar longitudinally, said lever being operatively connected to the pedal, and a selector means which in one position causes successive operations of the pedal to rock the lever to put the mechanism successively into intermediate and high and thence alternately into intermediate and high only, in another position successively into low and reverse, and in another position into reverse, together with means whereby when the pedal is actuated and the mechanism is shifted into the said reverse, the mechanism will stay in reverse as long as the selector means is undisturbed.

16. In a gear-shifting mechanism, two gear-shifting bars, means for selectively locking one of the bars in its intermediate position, one bar controlling intermediate and high and the other low and reverse, means whereby, when the bar controlling intermediate and high is locked, the movement of the other bar to set the mechanism into low applies yielding pressure of the interlocking means tending to unlock the locking bar and lock the said other bar, and means preventing the lock from locking the said other bar until it is moved to its intermediate position.

17. In a gear-shifting mechanism, a lever for throwing the mechanism into low, intermediate and high, means for locking said lever when the mechanism is intermediate or high, means for locking said lever when any of the gears of the mechanism are in mesh, a pedal for operating the said lever, and a selector means for causing at a single setting thereof successive operations of the pedal to automatically throw the mechanism into low, intermediate and high, and thence alternately into intermediate and high only.

18. In a gear-shifting mechanism, a lever for throwing the mechanism into low and reverse, means for locking the lever when the mechanism is in low or reverse, a pedal for operating the said lever, and a selector means for causing at a single setting thereof successive operations of the pedal to automatically throw the mechanism into low and reverse, and thence alternately into low and reverse only.

19. In a gear-shifting mechanism, the combination with a pair of fork members arranged to shift the gears in the mechanism and means for locking one of said fork members against movement, of a clutch pedal, an operating lever having its ends in direct pivotal connection with the fork members, operative connection comprising a pitman between the clutch pedal and said lever to rock the latter for moving the unlocked fork member while the lever pivots on the locked fork member, and selector means arranged to vary the movement of the pitman to progressively shift the gears in the mechanism by successive movements of the clutch pedal.

20. In a gear shifting mechanism, the combination with a pair of fork members, one of said members being arranged to mesh the reverse gears or low gears and the other member arranged to mesh the intermediate gears or the high gears of the mechanism and means for locking one of said fork members against movement, of a clutch pedal, an operating lever arranged to move and having its ends in direct pivotal connection with the fork members, operative connection comprising a pitman between the clutch pedal and said lever to rock the latter for moving the unlocked fork member while the lever pivots on the locked fork member, and selector means arranged to vary the movement of the pitman for shifting the gears from low into intermediate and thence to high and thereafter alternately into intermediate and high only by successive movements of the clutch pedal.

FRANK P. LACKINGER.